Figure 1:
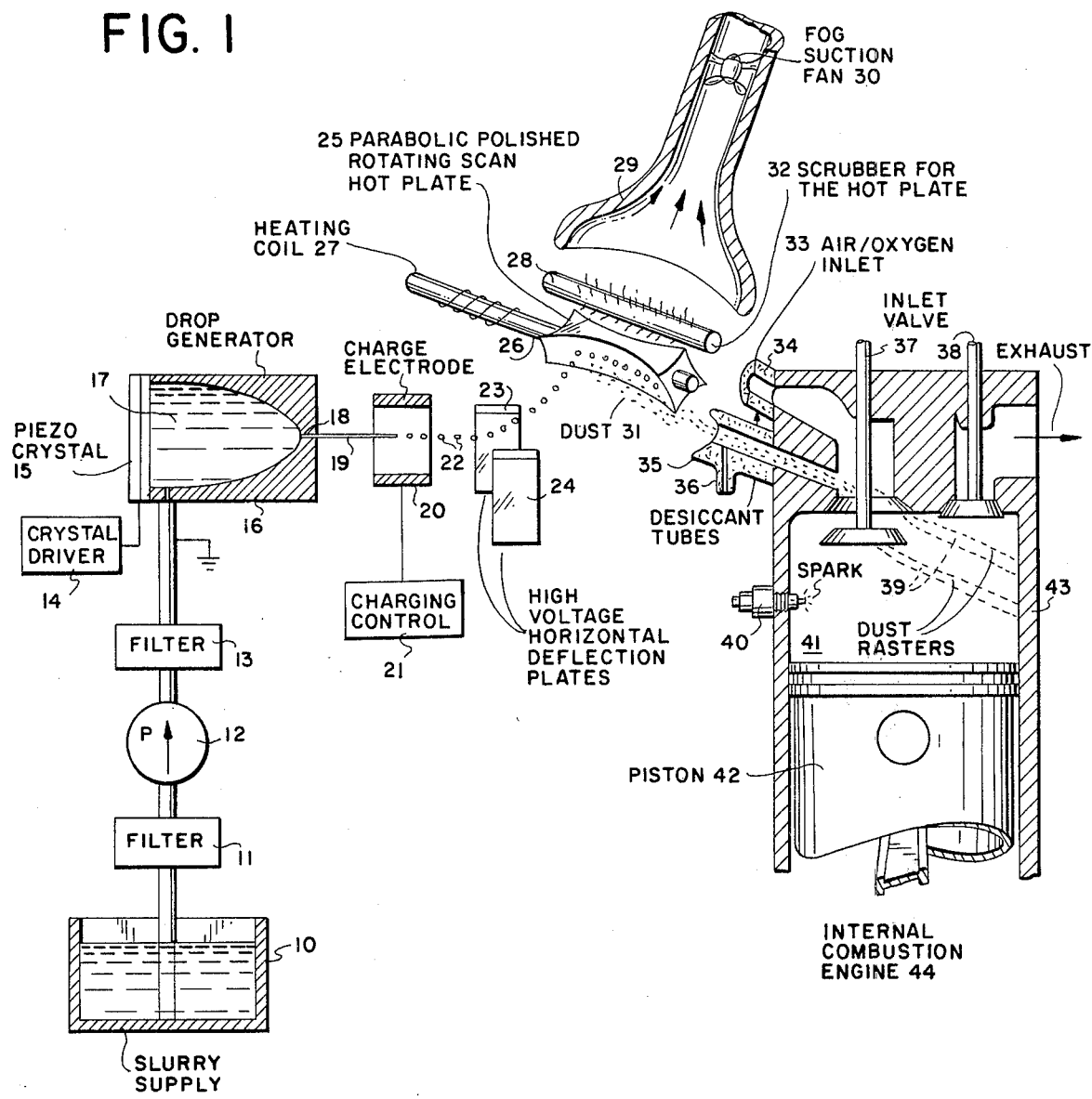

United States Patent [19]

Armbruster

[11] 4,240,379
[45] Dec. 23, 1980

[54] METHOD AND MEANS FOR CONTROLLING EXPLOSIVE DUST WITH COMPUTER PROGRAMMED STRATIFIED FUEL INJECTED COMBUSTION

[76] Inventor: John W. Armbruster, 475 Munroe Ave., North Tarrytown, N.Y. 10591

[21] Appl. No.: 918,560

[22] Filed: Jun. 23, 1978

[51] Int. Cl.³ .................... F02B 45/08; F02B 19/04
[52] U.S. Cl. .................................. 123/23; 123/536; 123/575; 123/198 A
[58] Field of Search ................. 23/23, 1, 127, 119 E, 23/198 A

[56] References Cited

U.S. PATENT DOCUMENTS

| | | | |
|---|---|---|---|
| 1,059,957 | 4/1913 | Dunham et al. | 123/198 A |
| 1,656,678 | 1/1928 | Pawlikowski | 123/23 |
| 1,719,023 | 7/1929 | Pawlikowski | 123/23 |
| 1,897,819 | 2/1933 | Pawlikowski | 123/23 |
| 1,921,132 | 8/1933 | Pawlikowski | 123/23 |
| 2,182,874 | 12/1939 | Kowalski | 123/198 A |
| 2,625,141 | 1/1953 | Berlyn | 123/23 |
| 4,031,864 | 6/1977 | Crothers | 123/127 |
| 4,077,367 | 3/1978 | Steiger | 123/23 |
| 4,077,374 | 3/1978 | Willmann et al. | 123/119 E |

Primary Examiner—Craig R. Feinberg

[57] ABSTRACT

A method of fueling an internal combustion engine using explosive dust, characterized by making a slurry of particles of grain dust, jetting said slurry to arrange said particles seriatim, drying said seriatim particles, injecting said dried particles in a series of computer controlled program of successive rasters into said engine, adding dried oxygenated air to said dried injected particles and igniting said rasters of dried dust particles inside said engine to drive the piston.

10 Claims, 3 Drawing Figures

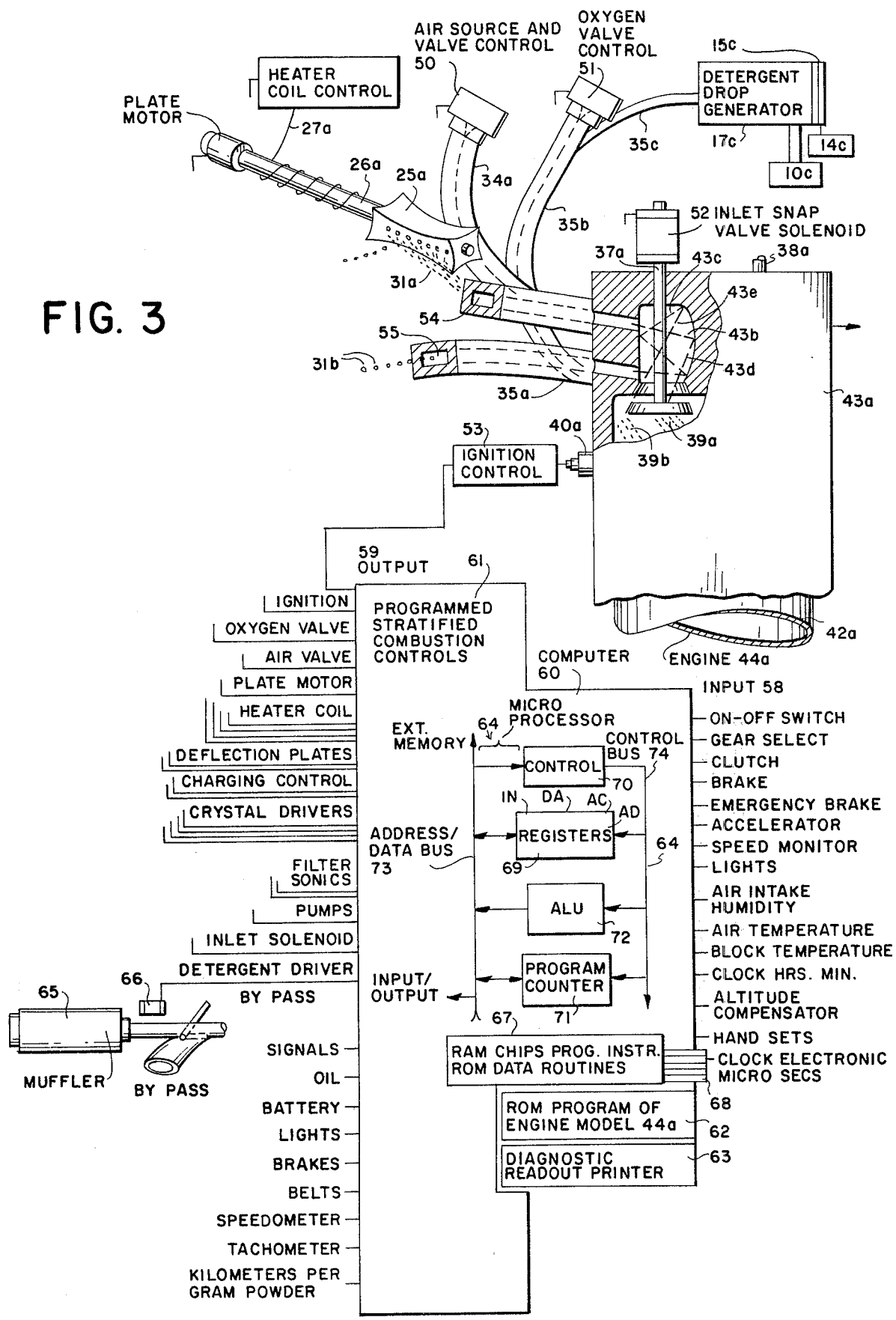

METHOD AND MEANS FOR CONTROLLING EXPLOSIVE DUST WITH COMPUTER PROGRAMMED STRATIFIED FUEL INJECTED COMBUSTION

BACKGROUND OF THE INVENTION

The present invention provides a method of and apparatus for the creation of new sources of energy and the novel computer controls therefor to make such energy regulated to the best advantage.

In the 1970s it has become apparent that the usual main sources of energy, oil and gas, are in short supply and expensive. That is known as the Energy Crisis. Much of this crisis is caused by the demand for automobile fuel. The billions of explosions of gas in the few confined cubic inches above the cylinders of the internal combustion engines are the major expenders of fuel. There have been many attempts heretofore to use solid fuel in an engine but the simple controls therefor have not worked. It is well known that grain dust and coal dust are explosive materials when there are conditions of a critical distribution of such dust coupled with confinement, dryness, oxygenation and ignition. One object of this invention is to provide computer methods and controls for regulating said conditions of explosive dust outside and inside the cylinder head of an engine. Regarding the supply of coal and grain, it is known that coal is extant in a large quantity and that grain is inexhaustible because it is everlastingly renewable and that is the kind of supply for the future. In the U.S. Patent Office Class 262 Coal Mining, there is a subclass 34, Mine Safety Systems; and a Class 241 Flour Milling, there is a subclass 31 for apparatus with explosion preventing or relieving means. Said subclasses and patents therein provide guidelines for conditions which should prevail outside a cylinder head, and conversely suggest opposite conditions which should be brought into being inside a cylinder head, however, they do not teach or suggest the method and means of the present invention which are about to be set forth in greater detail. Before going into detail, it is well to point out that the control of slurries of ink with some particles is explained in the IBM Journal of Research and Development, Vol. 21, No. 1, 1977, Ink Jet Printing, which explains in detail the kind of jet apparatus used here for fuel injection and states in short "drop formation can be controlled by vibrating the ink within the nozzle cavity at a fixed ultrasonic frequency. The pressure waves cause the jet to break up into a stream of drops of uniform size and spacing at a well defined distance from the nozzle." Also in the IBM U.S. Pat. No. 4,019,188 the Abstract explains that it is "A micromist printing arrangement wherein a micromist of ink particles, provided by an ultrasonic nebulizer, is forced through a small nozzle to form an aerosol jet." The IBM Journal and Patents are herewith incorporated by this reference for their showings of jet apparatus in general.

SUMMARY OF THE INVENTION

In the figures:

FIG. 1 depicts devices for storing a dust slurry, filtering the slurry, and acoustically and electrostatically projecting the slurry particles in successive rasters of a dust pattern inside the cylinder of an internal combustion engine.

FIG. 2 and FIG. 3 show a more comprehensive system with dual drop jet generators and computer programming means for controlling the jets to stratify the fuel rasters under changing conditions for optimum effect.

DESCRIPTION OF THE INVENTION

This invention deals with the method and computer apparatus for controlling sugar grain and coal dust clouding so that there is produced a critical distribution of dust subject to controlled ignition only when and where an explosion is to take place, as in the closed cylinder of an engine.

In the FIG. 1 it is seen that a dust slurry supply tank 10 is connected to a pump 12 and a pair of filters 11 and 13 control the size of grain dust particles 31 allowed to enter the well 17 of the drop generator 16. At one end of the generator 16 there is shown the piezo crystal 15 driven by Driver 14 and resonant ultrasonically to direct the jet stream 19 of the slurry thru the nozzle 18 to form droplets 22. These droplets 22 are charged by the electrode 20 and sent successively between the high voltage deflection plates 23 and 24 in a controlled horizontal sweep to form a raster of bouncing dust particles 31 off the hot plate 25 formed with hard parabolic surfaces as rotated on rod 26 and heated by coil 27. Rotation of hot plates 25 is controlled to form successive vertical rasters of the sweeps or scans of the charge plates 23 and 24. Thus there is formed a 3D pattern 39 of dust particles inside cylinder space 41 of cylinder 43. Hot plate 25 may be formed with recesses or slots which are to appear in the duct droplet path at such times as when the inlet valve 37 is closed. This, with provisions for runoff and drainage, prevents clogging with unwanted droplets and dust.

Cooperating with hot plate 25 is a scrubber 32 comprising a rotating rod 28 having many flexible wipers to rub off all excess moisture and dust so a truly reflective surface continues to be presented to the bombardment of the droplets 22.

Also suspended above the hot plate 25 is a fog remover involving a scoop shaped emitter 29 and a fog suction fan 30 for driving the mist away from the hot plate and the scrubber. This suction operates gently to avoid interfering with the trajectory of the dust projections.

As the bouncing dust particles 31 are directed into the open inlet valve chamber, such particles are directed thru tubing 35 of a desiccant material to further dry the dust. A similar kind of desiccant tube 34 is provided at the air and oxygen inlet 33 to insure the proper degree of dryness of the gaseous component of the explosive mixture. The air may be stratified just as the dust is.

When the dust charge 39 and air 33 are properly proportioned and distributed, the inlet valve 37 closes, piston 42 rises to compress the charge, and spark plug 40 fires to ignite the explosive charge and the piston 42 is driven down to drive the engine 44.

The length and nature of the desiccant tubes 34 and 35 are selected to produce desired degrees of dryness of air and dust. An example of absorbent material for taking up to 3,000 times its weight in water is shown in U.S. Pat. No. 4,045,387.

Regarding grain dust explosive conditions, there is an entire Patent Office subclass 241/31 devoted to means for preventing such happenings. The proposition here is to adopt and control the teachings of that subclass outside the engine cylinder and reverse such taught conditions inside the cylinder.

Although the invention is illustrated in connection with a reciprocating engine it is contemplated that a rotary engine has some applicable and desirable attributes.

It is also contemplated that the desired end product is energy in the form of direct heat instead of engine drive. In which case the cylinder 43 is to be formed with heat radiating fins inside a heating duct along with an electrical heating resistance element powered by the engine. It is a pleasant thought that a grain farmer may drive his machinery and heat his home with his own product.

As an alternative structure to that shown, it is contemplated that what may be used is an Aiken cloud chamber of desiccant material and formed at one end with an acoustical resonator and the other end with a restricted nozzle through which the sieved dust particles in the cloud chamber may be projected directly into the engine cylinder head. In other words, the dust need not be in a slurry, but dry in and out of the chamber, and projected acoustically and electrostatically in a predetermined dust distribution pattern or matrix of positions inside the cylinder before ignition.

Referring to the Encyclopaedia Britannica under the heading "DUST" a chart is found concerning the explosibility of dust as governed by its fineness, distribution, and content of volatile combustible matter. The concentration of various types of dust which causes maximum explosibility is given in the chart. The size of these dusts is such that all will pass through a 200 mesh sieve. The chart appears as follows:

| TYPE OF DUST | OUNCES PER 1,000 CU. FT. |
|---|---|
| COAL | 200–600 |
| SUGAR | 200–1,000 |
| CORN, WHEAT, STARCH | 200–600 |
| ALUMINUM | 500 |
| SULPHUR | 1,000 |

It will be noted that powdered sugar is regarded as a potent explosive material. Therefore, as another alternative method of implementing the present invention, the control of sugar from a syrup to a powdered condition is of interest. In such an instance, referring to the sketch, container 10 holds a sugar syrup instead of a slurry.

Such a syrup may be plain or contain dust particles of coal, sugar, starch, aluminum, magnesium or sulphur for the purpose of accelerating the seeding of, and formation of, powdered crystallization of the projected syrup droplets. Once the syrup droplets have been formed (by the ink jet devices) and charged and deflected, the hot plate is no longer needed, and instead there is direct projection of the syrup droplets thru the tube 35, and conditions of temperature, oxygenation and dryness may be set up in the guide tube 35 such that the entering syrup droplets exit into engine 44 as a predetermined pattern and amount of powdered sugar crystals which do or do not contain enclosed additional explosive seeding dust such as coal, sugar, etc. The chart indicates that 0.2–1.0 ox. per cu. ft. of such material is a maximum explosive. There is a Patent Office Class 127 dealing with sugar refining and its subclasses 15, 58 and 61 are concerned with the formation of sugar crystals.

FIGS. 2 and 3 are a showing of an Injected Dust Motor System involving dual injection dust or particle jets on a motor vehicle controlled for stratified combustion by a computer with a microprocessor memory and programmed for optimum performance under rapidly changing conditions.

FIG. 3 shows how a computer 60 and its associated parts 61, 62 and 63 may exercise control over the driving of an engine 44*a* according to changing input values 58 in order to optimize output values 59 as determined by select memory values and predetermined program steps of 61 and 62 and stored values in the removable units 62 and 63.

It has been well recognized that an engine could perform better if an extremely fine control over fuel input could be exercised, and if two or more mixtures could be injected during intake. Less fuel is wasted if rich and lean mixtures are timed, proportioned and placed to best advantage, especially in mobile as distinguished from stationary engines. A stratified charge system is a way of feeding an engine a variable fuel-oxygen-air mixture that is changeable so that the engine is always being fed the right mixtures for the needs of the moment.

Although stratification of fuel may be achieved by proper control of a single fuel jet 17 as presented in FIG. 1, the desirable attributes of dual jet 17*a* and 17*b* should be considered as shown in FIG. 2. There it is seen that a first jet mechanism 17*a* may carry by way of example a grain dust which is to be projected along with air from a source 50 and thru valving 34 into an injection conduit 54. In a similar fashion a second jet 17*b* projects sugar dust which may or may not be seeded. This sugar dust is projected along with oxygen from a source 51, said oxygen being valved into 35*a* and into the conduit 55.

Stratification may be defined as brought about by presenting a small hot fast igniting fuel charge or raster 39*b* near the point of ignition 40*a*, and surrounding or encompassing said small charge by a larger slower-acting pushing type of fuel. An example, as shown, may be the small charge or raster 39*b* of oxygen-sugar derived from 17*b* and 51, followed by a larger charge or raster 39*a* of air-grain dust derived from jet 17*a* and source 50. To insure quick firm closure of inlet valve 37*a*, an inlet valve snap solenoid 52 is to be activated with computer controlled timing.

An additional improvement is the addition of detergent and blow-out cycles to clean the cylinders periodically of any remaining or sticking hot dust particles. These detergent cycles are aptly controlled as to intermittent timing and directed by the computer controls as part of the predetermined "programmed stratified combustion". A jet of detergent is injected by one of the same IBM ink jet apparatus 17*c* through the already existing inlet tubes 35*a* or 35*b* or an extra tube 35*c* or the exhaust port opening. Such a detergent input may be accompanied by control of a muffler by-pass 65, 66 and injection intermittently of highly volatile gas cycles to blow out the particles of hot dust which have been dislodged by the detergent. The detergent cycles are arranged to avoid hesitancy or stalling of the motor. In the case of the control of hot coal dust emissions, the addition of limestone dust to the slurry acts to contain the sulfur content of the emissions. A heavy fly-wheel may well be used to smooth out energy bursts.

In FIG. 2, either of the jets may be furnished optionally with a gasoline or alcohol or gasoline/alcohol mixture instead of those sugar and dust substances designated hereinbefore.

The 4 cycle motor shown, FIG. 3, is only by way of example when it is realized that a turbine, rotary Mazda type, diesel, Sterling or any expansion type of motor may be employed.

Although stationary engines and larger motors could benefit from the computer controls noted in FIG. 3, it is contemplated that the most widespread use would be in connection with small automobile motors. Therefore the contents of the computer 60 and its component parts should be compact as in microprocessor chips 64 readily accessible at or near the top of the motor with the exception of the diagnostic printer 63 which is removable and used only for periodic checkups.

It is understood that the cylinder interior cavity 43c and curved wall 43b and the piston top are to be shaped to and in the reflection aid distribution of the stratified rasters of fuel dust. The trajectory or particle bounce path lines 43d and 43e show how the incoming particles 31a and 31b are reflected and deflected in the shaped cavity 43c and against the curved wall 43b and other walls and past the sides of the head of valve 37a, i.e., through the annular valve space around and beyond the valve head to appear as the rasters 39a and 39b as shown. Raster 39b is spread by the seriatim timing and successive entry of lines of particles 31b and their deflection, and the larger raster 39a is more widely spread as noted hereinbefore by both the reflector plate 25a and the seriatim timing of entry and deflection.

Regarding further implementation of the ink jet device, reference may be made to patents: U.S. Pat. Nos. 3,992,713, 4,025,925, 4,027,309, 4,027,310, 4,007,464, 4,002,465, 4,019,188, And as to computerized programming of stratified dust combustion, reference may be made to computer patents: U.S. Pat. Nos. 3,626,427, 4,074,351, 4,085,691, 4,021,779

While the showing of FIG. 3 is for computer controls, etc., of only one cylinder, it will be understood that such facilities are to be duplicated for 4, 6, 8 or more cylinders according to the nature of the engine.

An example may be given explaining how the input values are coded to become microinstructions and data 67 for the microprocessor 64. A predetermined sequence of such microinstructions becomes a microroutine and that in turn becomes the desired output timing governed by clock 68 to and valves to constitute the control of programmed stratified combustion out at 59 which is the optimum firing desired. Assuming that the inputs 58 show that the car is in low gear, the accelerator is depressed, the block temperature is low, then all these instructions tell the microprocessor 64 that a rich fuel mixture is needed for the moment. Along with the foregoing, the ROM memory 62 of the particular engine 44a, instructs the microprocessor 64 that a 4 cycle routine is desired and the ignition sequence is another particular routine out of 67 and this is accompanied by data values for predetermined oxygen input and raster extensions for the fuel jet injectors 17a, 17b. Clock pulses 68 govern the timing of these data, instructions and routines in and out of the microprocessor 64 and into such controls as the oxygen valve, 51, the deflection plates 23b, 24b, driver 14b, charge coil 20b, etc.

Of course, the computer control could be of the conventional digital logic circuits of a rather fixed formation as in IBM U.S. Pat. No. 3,626,427 but the more flexible microprocessor 64 is a better choice for the present application in that it can be made to perform many different functions simply by changing a sequence of instructions stored in one or more memory sources, or inputs, or temporary memory registers such as 69 in the microprocessor, or external memory chips 67. A typical microprocessor contains several data storage registers 69. Three state logic provides the efficient way to transfer data from one of these registers 69 to another. In addition to several data, address, accumulator and instruction registers 69 the microprocessor contains a control section 70, a program counter 71 that steps through the instructions and data stored in the memories or entered, and an arithmetic logic unit ALU. It is the function of the control section 70 to fetch instructions one at a time from the ROM, or RAM program memories, or inputs 58 connected to the microprocessors address/data bus 73, decode and then execute them with a sequence of microinstructions after which it fetches the next instruction.

The program counter 71 keeps track of a program that is being executed. It is simply a counter whose outputs are used as address inputs to the external memory containing the program and data being processed by the microprocessor 64. Normally, the program counter 71 sequences numerically. Certain instructions can load the program counter 71 with a new data word which it will then use as the next external memory address. This allows the microprocessor 64 to branch, or jump, to different parts of a program or loop through a specified section of a program more than once. In the present application we have the useful and novel way of looping successively thru such as a four cylinder firing sequency repetitively, or, upon a change of the ROM 62, a six cylinder sequence.

The arithmetic 72 logic unit ALU of the microprocessor 64 can perform arithmetic or logic operations on one or two data words. Usually, the accumulator register 69 supplies one of the words to be processed by the ALU. For example, it could be assumed that the word supplied is one factor which along with a block temperature word is to be calculated and then the result fed from the ALU's output back to the accumulator register over the address/data bus 73 and eventually over to the deflection plate controls 56, 57, to increase or decrease raster width.

The incredible speed and versatility of the microprocessor is utilized in this showing in the explosives field and the role of the spritely microprocessor is in making many determinations, very early, and based on many internal (of the explosives per se) and external factors. In general, FIG. 2, the external factors are the inputs 58 grouped at the right, and stored memory data, instructions, programs routines in ROM and RAM; while the results to be effected are directed out of the outputs 59 at the left.

It is contemplated that each engine cylinder will also have, in addition to the showing, a pair of sensors, or heat responsive detectors, one near the ignition point and one remote therefrom. These serve to tell the microprocessor how the stratification is performing and whether a remedy in the fuel mix is needed. In addition to these heat detectors, pressure sensitive detectors may also be employed. Such sensors for heat and pressure are provided inside each cylinder to detect premature firing (as by residual hot powder). These sensors activate faster intake port closure by activating the port snap solenoid 52 through the microprocessor. Offhand, one might say why not direct solenoid action? The answer is that by furnishing the microprocessor the premature explosion instruction not much micro time is lost, and in addition it is instructed that normal cycling is temporarily distorted and then there is to follow a detergent injection cycle by drop generator 17c which may be instructed as a branch with additional branch action of initiation of a high volatility cycle and blow out control followed by a high volatility cycle to recover momentum.

Although microsecond times are mentioned throughout, it is to be realized that even faster time divisions of the microprocessor may be provided.

Because of the well known characteristics of the four cycle engine of intake, spark, exhaust, much of the software requirements of successive instructions are obvious, however, throughout this specification special needs are set forth.

In the ordinary stratified cycle, the actions programmed in one cylinder may be outlined, it being understood that in a four cylinder engine, three other duplication actions are involved in the firing order. Instructions are to scan the input conditions first for all pertinent startup values of gear setting, block temperature, etc. With this information the microprocessor initiates action of crystal driver 14b, charging control 21b, deflection control 57 to jet into the cylinder 43a, a raster 39b of sugar powder/oxygen near the spark point. The foregoing is immediately followed by action of crystal driver 14a, charging control 21a, deflection control 56 to jet into the cylinder 43 a second raster of air/grain powder 39a which piles up behind the highly volatile sugar which is then ignited by the timed ignition spark thru control 53 and plug 40a. This is also timed to occur at or over the top thrust of the cylinder piston 42a which is synchronized with the progressive program instructions thru the microprocessor at all times. It is possible by programmed instructions to vary the ratio of the strata 39a, 39b or eliminate altogether one of the pair. For example, should the engine be running smoothly at highway speed, it could be advisable to run altogether on the cheaper grain fuel. And, on the other hand, at emergency racing speeds, the microprocessor could determine that a rich oxygen sugar powder fuel is demanded. In any event, all of the characteristics of both strata as to timing, intensity, raster width, etc. can be finely tuned by the microprocessor.

The program instructions for looping are employed only when simple repetitive firing cycles are found to be invariable. In most instances, surrounding conditions change (such as a warmer engine, hill to be climbed in low gear, etc.) and the program must progress with variations.

Figure 2:
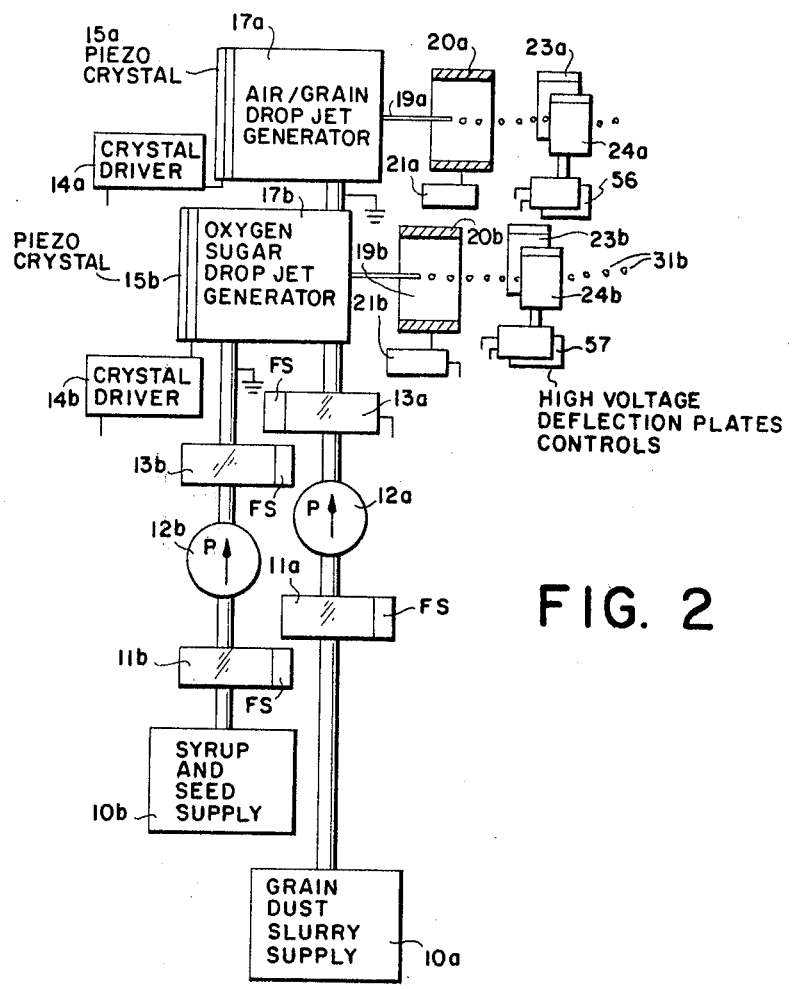

In order to periodically measure grams of powder used per kilometer, as indicated at the lower left output, FIG. 2, grain slurry supply 10a may be mounted on a scale and the weight lowing of said scale measured over a 10 kilometer period on the speedometer, and a known data figure of powder grams per liter of slurry combined in the microprocessor to reveal the resultant figure by any of several well known displays.

While this application has stressed the use of unusual dust fuels, it is to be realized that the controls set forth are also very useful in connection with the more conventional fuels as diesel fuel, gasoline, alcohol, benzene, kerosene, etc. or various mixtures of the same and the claims are to be understood to encompass such conventional fuels.

What is claimed is:

1. A method for making the fueling of an engine subject to micro interval changes in fueling compatible with the speed of a high speed computer with programming and memory instruction components for carrying on computations relative to the fueling of the engine comprising the steps of, providing fuel portions ultrasonically at micro second intervals; distributing said fuel portions in rasters of variable size; predetermining by program and memory instructions the sizes and times of provision of said fuel rasters according to rapidly changing engine load conditions;

sensing a particular engine load condition; and igniting the provided fuel raster.

2. An injection valve system for injecting an explosive dust into and internal combustion engine, said system having said dust provided in a slurry prior to injection and comprising:

means for filtering said slurry;

a slurry storing chamber having a piezo crystal ultrasonic vibrator on one side and a jet opening structure on another side;

means for operating said crystal to project said slurry out of said jet opening in microscopic dust containing droplets at micro second intervals;

means for charging said droplets;

electrostatic means for spreading said charged droplets in raster patterns;

means for drying said patterns of droplets to free the dust therein; means for directing the dust patterns into said engine; and, means for exploding said dust patterns within said engine.

3. A method for operating an internal combustion engine having a fuel receiving cylinder with successive rasters of separate distributed fuel portions, said method comprising the steps of, storing said fuel in a fuel chamber with a jet nozzle;

expelling said fuel portions out of said nozzle ultrasonically at micro second intervals;

charging said expelled fuel portions;

deflecting and distributing said expelled fuel portions electrostatically with said successive rasters of fuel portions into said receiving cylinder;

adding a gas to said fuel portions; and igniting said successive rasters of fuel portions.

4. A method as set forth in claim 3 wherein said fuel portions include carbonaceous dust of one mil particle size, and which further comprises the step of drying said dust.

5. A method as set forth in claim 3 wherein said fuel portions include carbonaceous dust and an alcohol vapor and which further comprises the steps of, determining ignition timing intervals, counting said intervals, and injecting a detergent after a predetermined number of ignition intervals.

6. A method for operating an internal combustion engine having a fuel receiving cylinder receptive to a plurality of different successive rasters of separate distributed differing fuel portions, said method comprizing the steps of storing said differing fuels in separate fuel chambers with separate jet nozzles; expelling said differing fuel portions out of said nozzles ultrasonically at differing micro second intervals;

charging said expelled fuel portions;

separately deflecting and distributing said differing expelled fuel portions electrostatically with separate and different successive rasters of stratified fuel portions into said receiving cylinder;

adding gases to said separate fuel portions; and igniting said rasters of fuel portions.

7. A method as set forth in claim 6 wherein associated with said engine is a computer with a memory component and which further comprises the steps of, entering into said computer memory component data values of performance characteristics of the particular engine;

combining said performance data with current engine demand data in said computer; and regulating according to rapidly changing demands the pluralities of differing expelling charging, distributing and igniting steps to effect changes in fueling at microsecond speeds.

8. A method as set forth in claim 6 wherein there is associated with said engine a microprocessor computer with memory and programming components and a detergent injecting means and which further comprises the steps of, furnishing said computer memory component with constant values of performance data of a particular engine;

supplying said computer programming component with instructions relative to timing and quantitative operation of said expelling and deflecting steps;

injecting said detergent; and governing by said computer and regulation of said expelling, charging, deflecting, igniting and detergent injecting steps for optimum engine operation.

9. A method as set forth in claim 6 wherein said differing fuels and gases are of differing volatility and associated with said engine is a microprocessor computer and which further comprises the steps of, gauging the demands of said engine as data under fluctuating loading conditions;

entering said demand data into said computer; and governing by said computer said expelling, charging, deflecting and igniting steps to select the proportions of said differing fuel portions, their distribution, rates of expelling and timing of ignition to provide optimum engine drive.

10. A method as set forth in claim 9 wherein said engine has a blowout muffler bypass means and involves the further steps of, counting the times of ignition;

selecting the predominance of the fuel of higher volatility after a predetermined number of said counted ignitions; and operating said muffler by pass concurrently with said selecting step.

* * * * *